United States Patent

Gedda et al.

[11] Patent Number: 6,056,110
[45] Date of Patent: May 2, 2000

[54] ARRANGEMENT IN OVERHEAD CONVEYOR

[75] Inventors: Martin Gedda; Joakim Eriksson, both of Borås, Sweden

[73] Assignee: S. Berendsen AB, Malmö, Sweden

[21] Appl. No.: 09/290,196

[22] Filed: Apr. 13, 1999

Related U.S. Application Data

[63] Continuation of application No. PCT/SE97/01725, Oct. 15, 1997.

[30] Foreign Application Priority Data

Oct. 15, 1996 [SE] Sweden .................................. 9603778

[51] Int. Cl.⁷ ........................................... B65G 29/00
[52] U.S. Cl. ............................. 198/465.4; 198/841
[58] Field of Search .................... 198/465.4, 687.1, 198/841

[56] References Cited

U.S. PATENT DOCUMENTS

| | | | |
|---|---|---|---|
| 4,967,897 | 11/1990 | Lachonius et al. | 198/841 |
| 5,404,992 | 4/1995 | Robu et al. | 198/465.4 |
| 5,660,114 | 8/1997 | Gruber | 198/465.4 X |
| 5,857,560 | 1/1999 | Bjorkholm | 198/841 X |

FOREIGN PATENT DOCUMENTS

| | | |
|---|---|---|
| 464 409 | 5/1988 | Sweden . |
| P20179.11 | 7/1988 | Sweden . |
| 95/11849 | 5/1995 | WIPO . |
| 96/19401 | 6/1996 | WIPO . |

*Primary Examiner*—Robert P. Olszewski
*Assistant Examiner*—Gene O. Crawford
*Attorney, Agent, or Firm*—Smith, Gambrell & Russell, LLP

[57] ABSTRACT

An arrangement in an overhead conveyor, which has a chain part, a guide part, and load carriers connected or convertible to the chain part. The chain part is formed of a plurality of rotationally symmetrical driver bodies arranged in a row, and flexible connecting means interconnecting the driver bodies. The guide part is formed of a substantially U-shaped section opening upwards, with a groove in which the chain part is adapted to travel and be guided by inwardly directed sliding surfaces formed of slide elements. Slide elements are also arranged on the tops of the U section legs, and the load carrier rests with an arm against one of said tops. A second arm of the load carrier extends outside the leg of the U section for connecting a load. The load carrier engages the driver body in such a manner as to on the one hand rotatably support the driver body or the connecting means in positions adjacent to the driver body about the rotational symmetry axis thereof extending in the longitudinal direction of the guide part and, on the other hand, lock the driver body against movement in the transverse direction of the guide part.

20 Claims, 3 Drawing Sheets

ARRANGEMENT IN OVERHEAD CONVEYOR

REFERENCE TO RELATED APPLICATION

This is a continuation of International Application No. PCT/SE97/01725, filed under the Patent Cooperation Treaty on Oct. 15, 1997.

BACKGROUND OF THE INVENTION

The present invention relates to an arrangement in an overhead conveyor.

SE-8802626-5 discloses a chain conveyor made up of a chain part, a guide part and load carriers, the chain part being formed of a plurality of spherical balls arranged in a row and interconnected by means of a wire. The guide part is formed of a U section, slide elements being arranged in the U section and on the top of the U legs and permitting low-friction sliding of the balls in the guide part. Load carriers engage between the balls. In a variant there are load carriers in the form of plates which are engageable by snap action in holes formed in the balls.

A drawback of the above chain conveyor when conveying suspended loads is that in the variant where the load carrier engages between the balls, the space occupied by the balls cannot be used for load carrying, and in the variant where the load carrier is formed of a plate, a suspended load cannot be carried. A further drawback of the first variant is that torque to which the load carrier is subjected owing to e.g. unsymmetrical load or when moving along curves of the U guide part causes jamming of the load carrier in the U guide part, high friction between the balls and the slide elements and, thus, a disturbed, transport function.

The object of the invention thus is to obviate the above drawbacks of overhead conveyors of the type described above.

BRIEF DESCRIPTION OF THE DRAWINGS

The object is achieved by an arrangement in an overhead conveyor which has the characteristic features stated in the claims.

An embodiment of the invention will now be described in more detail with reference to the accompanying drawings, in which.

DETAILED DESCRIPTION

Figure 1:
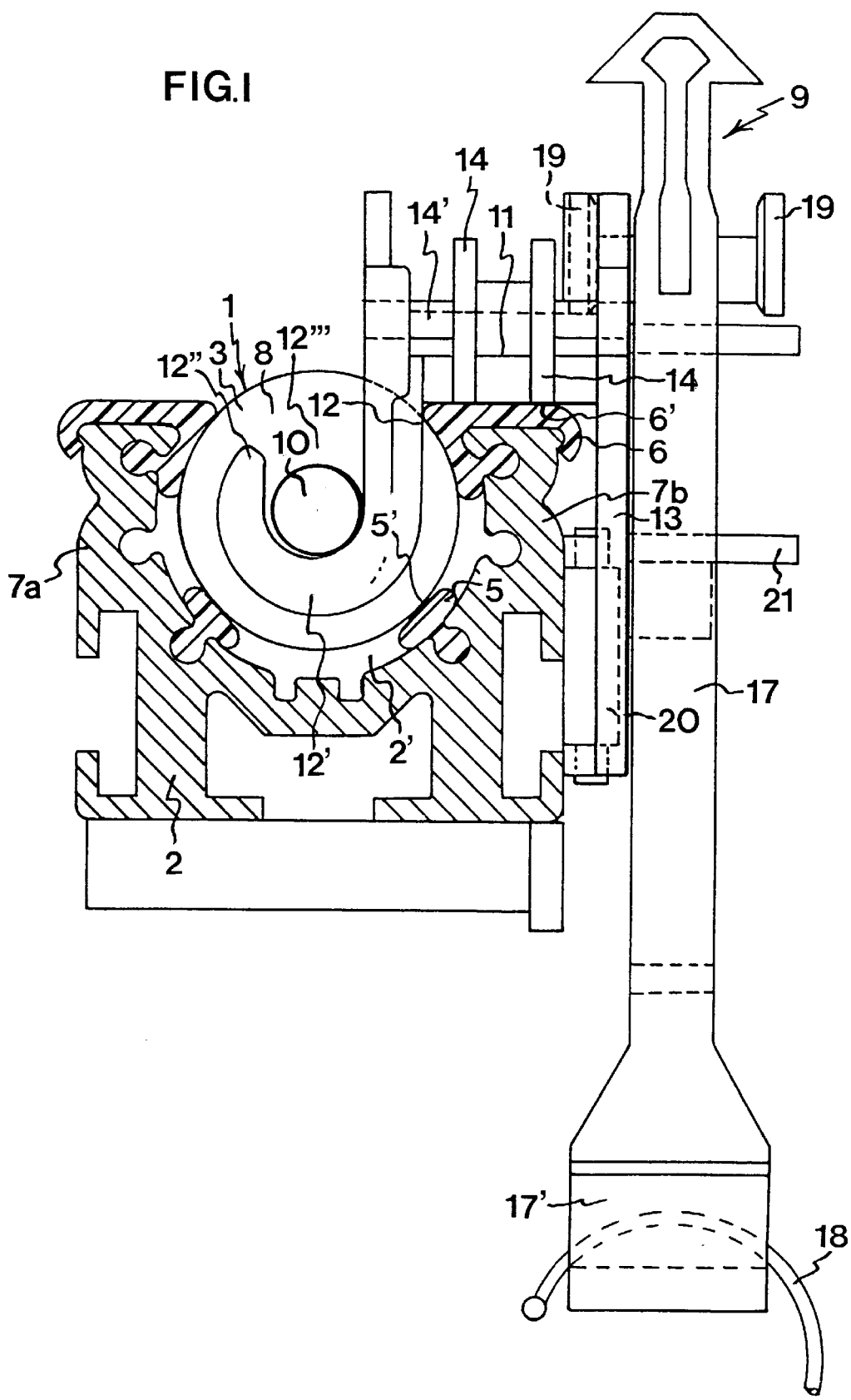
FIG. 1 illustrates an embodiment of an inventive arrangement in an overhead conveyor.
Figure 2:
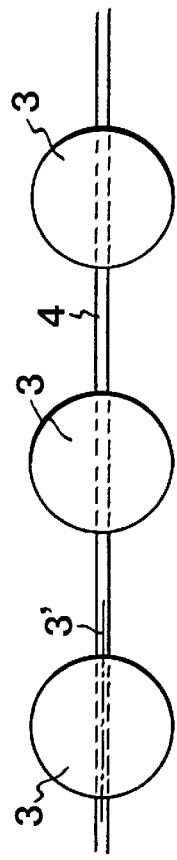
FIG. 2 illustrates the principle of a prior-art chain part.
Figure 6:
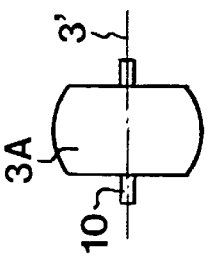
FIG. 6 illustrates a driver body in the inventive arrangement.

Reference is first made to FIG. 1. This shows a chain conveyor of the type according to SE-8802626-5 from one end of a chain conveyor section. The chain conveyor comprises a chain-part 1 and a substantially U-shaped guide part 2, the mouth of which is directed upwards and which is formed of a sectional beam. The chain part 1 is formed of a plurality of equidistantly spaced, spherical driver bodies 3 arranged in a row (FIG. 2) which are interconnected by means of a flexible wire 4. The driver bodies have a symmetry axis 3' along which they are interconnected and around which they are rotationally symmetrical. The interconnection can be effected by the driver bodies 3 made of low-friction plastic bring fixed by casting to a continuous wire 4.

The chain part 1 is adapted to travel in the groove 2' of the guide part 2 and is guided by sliding surfaces 5' formed of slide strips 5 made of low-friction plastic. Sliding surfaces 6' formed of slide strip 6 (made of low-friction plastic) are also arranged on the top of the legs 7a, 7b of the guide part 2, the slide strips partly filling the mouth or slot opening 8 of the U, such that the width of the opening is smaller than the cross-section of the driver bodies 3 transversely of the guide part 1.

For further details about this chain conveyor which is per se known, such as its drive mechanism for driving it in an endless loop, reference is made to above-mentioned patent publication.

The arrangement according to the invention will now be described by way of an embodiment, reference being also made to FIGS. 2–7. The embodiment comprises on the one hand a modification of the spherical driver bodies 3 of the above-mentioned patent publication and, on the other hand, a specially designed load carrier 9. The modification implies that the driver bodies 3 are designed as annular discs 3A with two opposite pin 10 (FIG. 6), which extend in said symmetry axis 3' and the free ends of which touch the imaginary sphere defined by the driver bodies 3. The load carrier 9 is practically in the shape of an inverted U in cross-section, its bottom part 11 being adapted to rest against the slide strip 6 on the top of one of the legs (in this case 7b) of the guide part 2, and legs 12, 13 being adapted to grip said guide leg 7b with a small play. The leg 13, which is arranged to extend along and adjacent to the outside of the U leg of the guide part, is adapted to be connected to the load which is to be conveyed by the conveyor.

Figure 7:
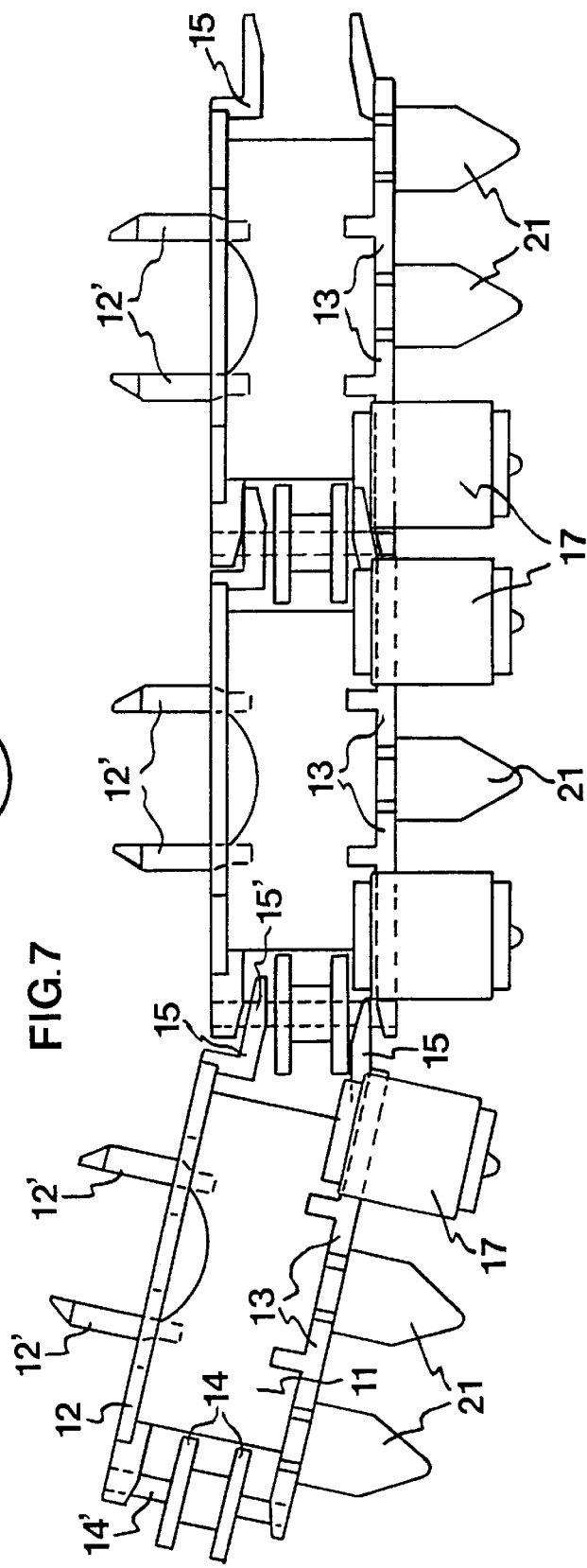
FIG. 7 is a top plan view of interconnected load carriers.
Figure 3:
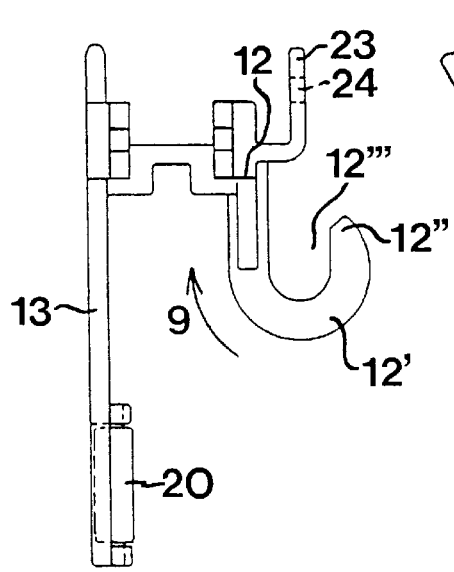
FIG. 3 is a side view of a first load carrier part in an arrangement according to the invention.
Figure 4:
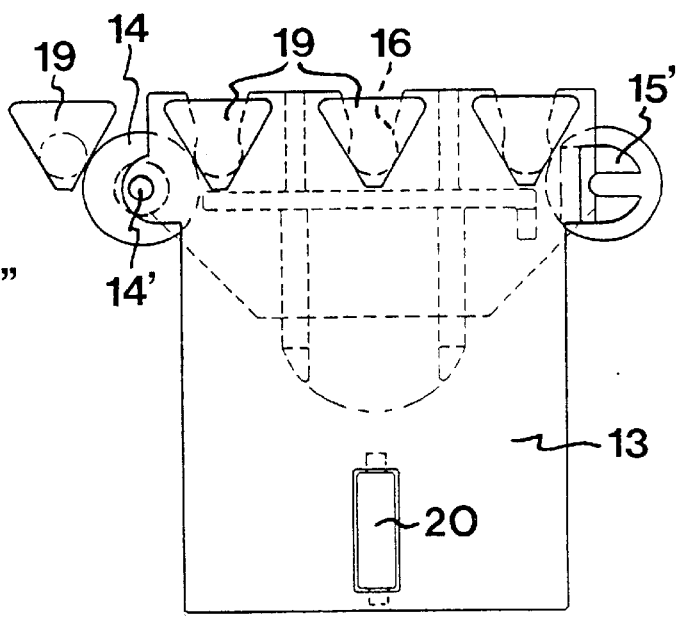
FIG. 4 is a rear view of the first load carrier part.
Figure 5A:
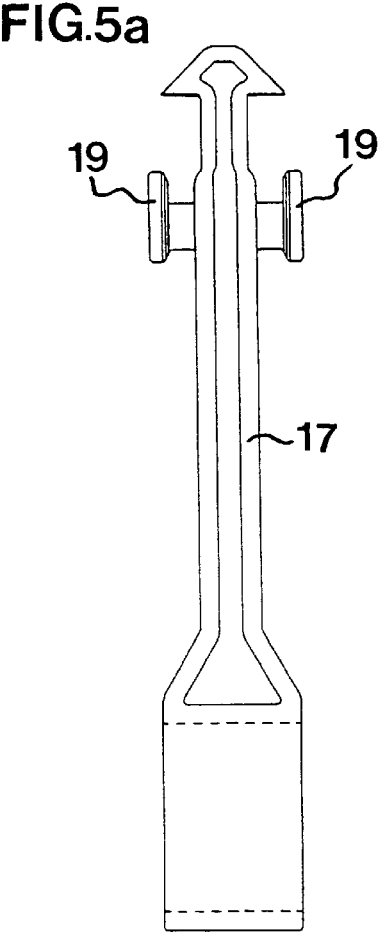
FIGS. 5a and 5b illustrate a second load carrier part from two directions, rotated through 90°.
Figure 5B:
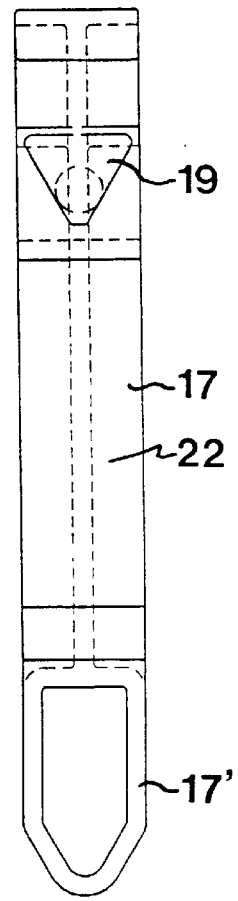

Reference is now also made to FIGS. 3 and 7. On the inner leg 12 of the load carrier 9 there are two hooks 12' which constitute pivot bearings for the pins 10 on the driver body 3A, i.e. the chain part can unimpededly rotate about said symmetry axis 3'. The hooks 12' are preferably designed in such a manner that they define together with the driver body 3A and the pins 10 thereof a spherical ball similar to the prior art ball 3 formed in one piece (FIG. 2), which is advantageous for maximum surface engagement and power distribution between the driver body 3 and the hooks 12' and, consequently, stability of the engagement between the hooks 12' and the driver body 3A, and is advantageous also by the driving of the prior art chain conveyor requiring no change since the shape of the prior-art spherical driver bodies has been modified.

The free end 12' of the hooks 12' extends beyond the symmetry axis 3' in order to lock the driver body 3A, 10 against movement transversely of the conveyor (see FIG. 1), but simultaneously the hook opening 12''' is sufficiently great to allow fixing and removal of the load carrier 9 to/from the driver body 3 on the pins 10, which can take place before the corresponding chain part is inserted in the groove 2'.

Owing to the described construction of the embodiment of the inventive arrangement, it has been achieved that the load carrier 9 has a stable form engagement with the driver body 3 and a stable grip on the same, i.e. the load carrier has a defined position on the chain part 1 while at the same time the latter, is locked against movement transversely of the groove 2', i.e. it is not impeded or braked when travelling in the centre of the groove.

The bottom part 11 of the load carrier 9 has preferably a roll 14 in its front end (seen in the conveying direction) for contact with the slide element 6 and, thus, lower-friction driving by means of the chain conveyor, and may also have a roll at its rear end for the same purpose. Alternatively, it has a less expensive lug means 15 at its rear end, which can rest against the slide element 6, and it has longitudinally projecting forks 15' for engaging the roll shaft 14' of a subsequent load carrier, thereby permitting efficient utilisation of the space between the driver bodies 3 for closer suspension of loads.

The load carrier 9 illustrated is advantageously arranged for conveyance of loads that may have different width (in the longitudinal direction of the conveyor), e.g. articles of clothing (shirts, winter-coats), for instance in laundries. Three recesses 16 in the top of the load carrier leg 13 (see FIGS. 1 and 4) serve precisely to take such different widths into consideration. Since the position of the load carrier 9 on the chain part 1 is defined, the positions of these recesses 16 are also defined and can be determined by a photocell arrangement for accurate hooking on of clothes-hangers. For such hooking on, a special load connector 17 is in this embodiment arranged for a clothes-hanger 18 (possibly provided with an article of clothing), by means of which load connector 17 clothes-hangers 18 can be mounted on or dismounted from the overhead conveyor suspended from the load connector 17, in accordance with WO-95/28864. The load connector 17 has an opening 17' for hooking on a clothes-hanger 18 and lateral projections 19, by means of which (one thereof) it can be mounted in a recess 16 from above by snap action and be released from the recesses 16 by applying force from below.

Advantageously, the outer leg 13 of the load carrier 9 has a roll 20 (of plastic) for resting against and low-friction rolling on the outside of the guide part leg 7b while the load carrier carries a load.

Moreover, the outer leg 13 of the load carrier 9 has advantageously a projection 21 for guiding the load connector 17 when providing or releasing said snap-action engagement (arrow) between the recess 16 and the lateral projection 19, for which purpose an opening 22 is formed in the load connector 17.

The load carrier 9 can alternatively be injection moulded of plastic in one piece. Of course, it may be designed in such a manner as to grip, in the manner described above, two or more driver bodies.

A photocell arrangement can act on an upright flange part 23 with recesses 24 on the load carrier for determining the position of the recesses 16 or the load connector 17 and, thus, of the load conveyed by the conveyor.

The hooks 12' can, instead of the arrangement described above, grip the wire 4 on both sides of, adjacent to, the driver body. In a variant, there is only one hook on the load carrier which engages in a groove formed in a spherical driver body.

We claim:

1. An arrangement in an overhead conveyor having a chain part (1), a guide part (2), and load carriers (9) connected or convertible to the chain part, which is formed of a plurality of rotationally symmetrical driver bodies (3A) arranged in a row, and flexible connecting means (4) interconnecting said driver bodies, said guide part being formed of a substantially U-shaped section which opens upwards, through the groove (2') of which the chain part is adapted to travel and be guided by inwardly directed sliding surfaces (5', 6') formed of slide elements (5, 6), slide elements (6) being arranged also on the tops or the legs (7a, 7b) of the U section, the load carrier resting with an arm (11) against one of said tops, a second arm (13) of the load carrier extending along the leg (7b) of the U section for connecting a load, characterised in that the load carrier (9) engages the driver body in such a manner as to on the one hand rotatably support one of the driver body and the connecting means (4) in positions adjacent to the driver body (3A) about the rotational symmetry axis thereof which extends in the longitudinal direction of the guide part (2)

on the other hand lock the driver body against movement in the transverse direction of the guide part (2).

2. An arrangement as claimed in claim 1, characterised in that said one arm (11) supports at least one roll (14) for engaging the slide element (6) on the top or the U section leg.

3. An arrangement as claimed in claim 1, characterised in that said second arm (13) supports a roll (20) for engaging the outside of the U section leg.

4. An arrangement as claimed in claim 1 characterised in that said second arm (13) is made in two pieces, the pieces being engageable in each other by snap action.

5. An arrangement as claimed in claim 1, characterised in that a third arm (12) of the load carrier, which engages between the U section legs (7a, 7b), has at least one hook (12') constituting a pivot bearing for the driver body, e.g. for a pin (10) arranged on the driver body (3A), said pin extending along the rotational symmetry axis of the driver body.

6. An arrangement as claimed in claim 5, characterised in that the opening (12''') of the hook is dimensioned to allow fixing and removal of the load carrier to/from the chain part outside the guide part.

7. An arrangement as claimed in claim 5, characterized in that said one arm (11) supports at least one roll (14) for engaging the slide element (6) on the top of the U section leg.

8. An arrangement as claimed in claim 5, characterized in that said second arm (13) supports a roll (20) for engaging the outside of the U section leg.

9. An arrangement as claimed in claim 5, characterized in that said second arm (13) is made in two pieces, the pieces being engageable in each other by snap action.

10. An arrangement as claimed in claim 5, characterised in that the third arm (12) has two hooks for a respective one of opposite pins.

11. An arrangement as claimed in claim 10, characterized in that the driver body (3A), the pin (10) and the hook (12') together define a part-spherical surface.

12. An arrangement as claimed in claim 10, characterized in that the opening (12''') of the hook is dimensioned to allow fixing and removal of the load carrier to/from the chain part outside the guide part.

13. An arrangement as claimed in claim 10, characterized in that said one arm (11) supports at least one roll (14) for engaging the slide element (6) on the top of the U section leg.

14. An arrangement as claimed in claim 10, characterized in that said second arm (13) supports a roll (20) for engaging the outside of the U section leg.

15. An arrangement as claimed in claim 10, characterized in that said second arm (13) is made in two pieces, the pieces being engageable in each other by snap action.

16. An arrangement as claimed in claim 5, characterised in that the driver body (3A), the pin (10) and the hook (12') together define a part-spherical surface.

17. An arrangement as claimed in claim 16, characterized in that the opening (12''') of the hook is dimensioned to allow fixing and removal of the load carrier to/from the chain part outside the guide part.

18. An arrangement as claimed in claim 16, characterized in that said one arm (11) supports at least one roll (14) for engaging the slide element (6) on the top of the U section leg.

19. An arrangement as claimed in claim 16, characterized in that said second arm (13) supports a roll (20) for engaging the outside of the U section leg.

20. An arrangement as claimed in claim 16, characterized in that said second arm (13) is made in two pieces, the pieces being engageable in each other by snap action.

* * * * *